US00RE48099E

(19) United States
(12) Reissued Patent
Takahashi et al.

(10) Patent Number: US RE48,099 E
(45) Date of Reissued Patent: Jul. 14, 2020

(54) FUSER USING ENDLESS BELT AND IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventors: Kazutoshi Takahashi, Shizuoka (JP); Satoshi Kinouchi, Tokyo (JP); Ryota Saeki, Shizuoka (JP); Shoko Shimmura, Kanagawa (JP); Toshihiro Sone, Kanagawa (JP)

(73) Assignees: KABUSHIKI KAISHA TOSHIBA, Tokyo (JP); TOSHIBA TEC KABUSHIKI KAISHA, Tokyo (JP)

(21) Appl. No.: 15/829,494

(22) Filed: Dec. 1, 2017

Related U.S. Patent Documents

Reissue of:
(64) Patent No.: 9,075,362
Issued: Jul. 7, 2015
Appl. No.: 13/528,652
Filed: Jun. 20, 2012

U.S. Applications:
(63) Continuation of application No. 15/272,084, filed on Sep. 21, 2016, now Pat. No. Re. 46,634, which is an application for the reissue of Pat. No. 9,075,362.

(60) Provisional application No. 61/502,311, filed on Jun. 28, 2011.

(51) Int. Cl.
*G03G 15/20* (2006.01)

(52) U.S. Cl.
CPC ... *G03G 15/206* (2013.01); *G03G 2215/2009* (2013.01)

(58) Field of Classification Search
CPC ..... G03G 15/206; G03G 2215/2009; G03G 2215/2016; G03G 2215/2025; G03G 2215/2032
See application file for complete search history.

(56) References Cited

U.S. PATENT DOCUMENTS

| | | | | |
|---|---|---|---|---|
| 5,345,300 | A | 9/1994 | Uehara et al. | |
| 5,359,401 | A | 10/1994 | Uehara et al. | |
| 2007/0019979 | A1* | 1/2007 | Fujii et al. | 399/67 |
| 2007/0048043 | A1 | 3/2007 | Chang | |
| 2007/0166083 | A1 | 7/2007 | Satoh et al. | |
| 2008/0003029 | A1 | 1/2008 | Fujimori et al. | |
| 2008/0152403 | A1 | 6/2008 | Miyata et al. | |
| 2008/0181687 | A1 | 7/2008 | Ishino | |
| 2010/0322655 | A1 | 12/2010 | Kikuchi et al. | |

* cited by examiner

*Primary Examiner* — Joseph A Kaufman
(74) *Attorney, Agent, or Firm* — Kim & Stewart LLP

(57) ABSTRACT

According to one embodiment, a fuser includes a heat roller, an endless belt, a first press roller and a second press roller. The heat roller rotates and contacts a toner surface side of a sheet, and heats the sheet. The endless belt contacts a part of an outer peripheral surface of the heat roller. The first press roller contacts a part of an inner peripheral surface of the endless belt, and is provided at an insertion part of the sheet in a nip portion where the heat roller contacts the endless belt. The second press roller contacts a part of the inner peripheral surface of the endless belt, is provided at an exit part of the sheet in the nip portion, and has a lower rotational resistance than the first press roller.

12 Claims, 7 Drawing Sheets

FUSER USING ENDLESS BELT AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This application is a reissue continuation of application Ser. No. 15/272,084, which is an application for reissue of U.S. Pat. No. 9,075,362.* This application is based upon and claims the benefit of priority from the prior U.S. patent application No. 61/502,311, filed on Jun. 28, 2011, the entire contents of *each of* which are incorporated herein by reference.

FIELD

Embodiments described herein relate generally to a fuser and an image forming apparatus.

BACKGROUND

Hitherto, a fuser includes a heat roller and a belt arranged to be wound around a part of the heat roller. The heat roller is also called a fixing roller. Plural rollers are arranged inside the belt Although the belt is wound around the heat roller by the rollers arranged inside the belt, when a firm sheet such as a thick paper is fed, there is case where a space is generated between the heat roller and the belt due to the firmness of the sheet, and a floating phenomenon of the belt occurs. When the belt floats, adhesion between the heat roller and the sheet can not be maintained, and there is a problem that defective fixing occurs.

DETAILED DESCRIPTION

In general, according to one embodiment, there is provided a fuser including a heat roller, an endless belt, a first press roller and a second press roller. The heat roller rotates and contacts a toner surface side of a sheet, and heats the sheet. The endless belt contacts a part of an outer peripheral surface of the heat roller. The first press roller contacts a part of an inner peripheral surface of the endless belt, and is provided at an insertion part of the sheet in a nip portion where the heat roller contacts the endless belt. The second press roller contacts a part of the inner peripheral surface of the endless belt, is provided at an exit part of the sheet in the nip portion, and has a lower rotational resistance than the first press roller.

First Embodiment

Figure 1:
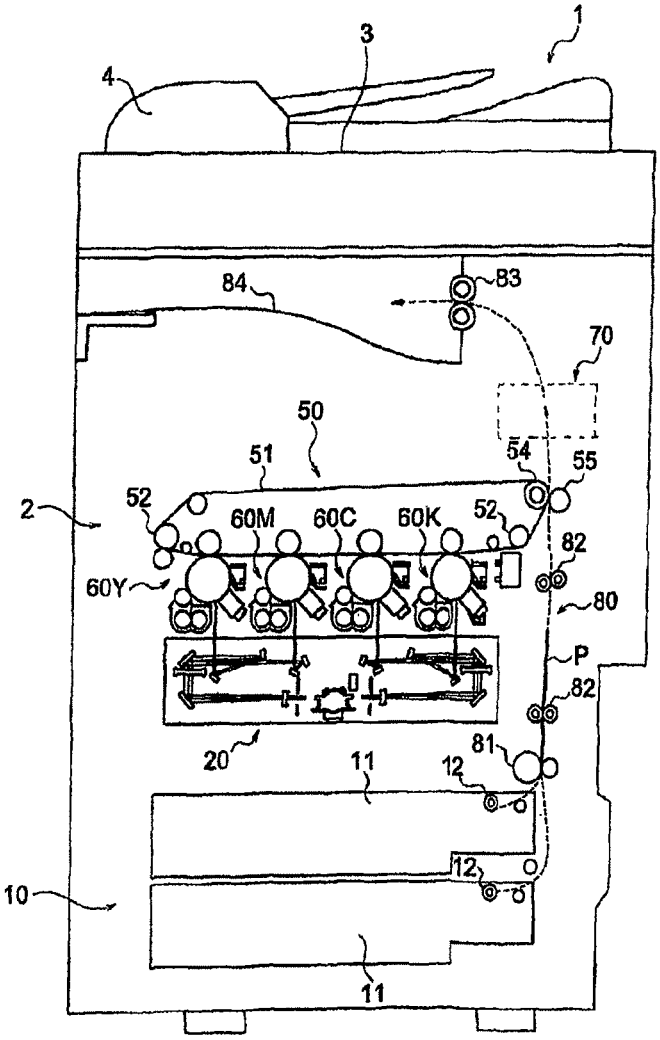
FIG. 1 is a vertical sectional view of an image forming apparatus of an embodiment.

FIG. 1 is a vertical sectional view showing a color multi functional peripheral (MFP) 1 as an image forming apparatus. The multi functional peripheral 1 includes a print section 2, a scanner section 3, a document feeding section 4 and the like.

The print section 2 includes a paper feed section 10, a laser optical unit 20, an image forming section 50, a fuser 70, a feeding section 80 and the like.

The paper feed section 10 includes plural paper feed cassettes 11 for containing sheets stacked in a laminate form, and pickup rollers 12 for feeding a sheet as an uppermost recording medium of the sheets contained in the cassettes 11 to the image forming section 50.

The image forming section 50 includes four sets of image forming stations 60Y, 60M, 60C and 60K of Y (yellow), M (magenta), C (cyan) and K (black), an intermediate transfer belt 51 to transfer toner images formed by the image forming stations 60Y, 60M, 60C and 60K, plural rollers 52 to apply a specific tensile force to the intermediate transfer belt 51, a drive roller 54 to drive the intermediate transfer belt 51, and the like. Besides, the image forming section 50 includes a transfer roller 55 as a transfer unit. A part of the intermediate transfer belt 51 is arranged between the drive roller 54 and the transfer roller 55.

The feeding section 80 includes register roller 81 to start feeding of the sheet sent from the pickup roller 12 at a specific timing to the image forming section 50, plural feeding rollers 82 to feed the sheet P sent from the register roller, and the like. Besides, the feeding section 80 includes a paper discharge roller 83 ala place just before the sheet P is discharged to the outside of the print section 2. A paper discharge tray 84 to receive the sheet P discharged by the paper discharge roller 83 is formed at the upper surface of the print section 2.

Figure 2:
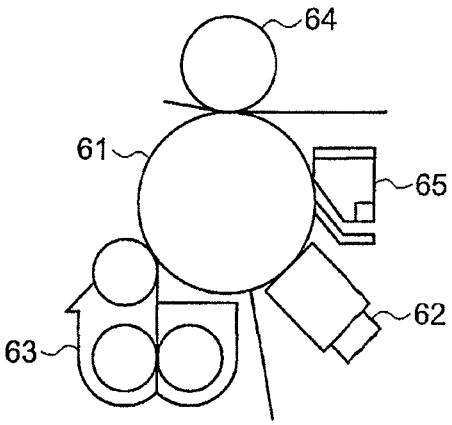
FIG. 2 is an enlarged view of the vicinity of a photoconductive body in FIG. 1.

Next, the description will be continued with reference to FIG. 2 showing an enlarged view of one image forming station 60.

The image forming station 60 includes a photoconductive body 61 to which light emitted from the laser optical unit 20 is irradiated, a charging unit 62 to give a uniform charge to the photoconductive body 61, a developing unit 63 that contains toner and supplies the toner to the photoconductive body 61, an intermediate transfer roller 64 to transfer the toner supplied on the photoconductive body 61 to the intermediate transfer belt 51, and a cleaning unit 65 to clean the toner that is not transferred to the intermediate transfer belt 51 but remains on the photoconductive body 61. The respective image forming stations 60Y, 60M, 60C and 60K have the same structure.

Next, the operation of image formation will be described.

The charging unit 62 gives a uniform charge to the photoconductive body 61. A latent image is formed on the uniformly charged photoconductive body 61 by the light emitted from the laser optical unit 20. The developing unit 63 supplies toner to the photoconductive body 61, and forms a toner image on the photoconductive body 61. The toner image formed on the photoconductive body 61 by the developing unit 63 is transferred to the intermediate transfer belt by the intermediate transfer roller.

Besides, the sheet P taken out by the pickup roller 12 from the paper feed cassette 11 is fed by the plural feeding rollers 82. When the sheet P reaches the transfer roller 55, the toner image formed on the intermediate transfer belt 51 is transferred. The sheet P on which the image is transferred is further fed, is fixed by the fuser 70, and is discharged to the paper discharge tray 84.

Figure 3:
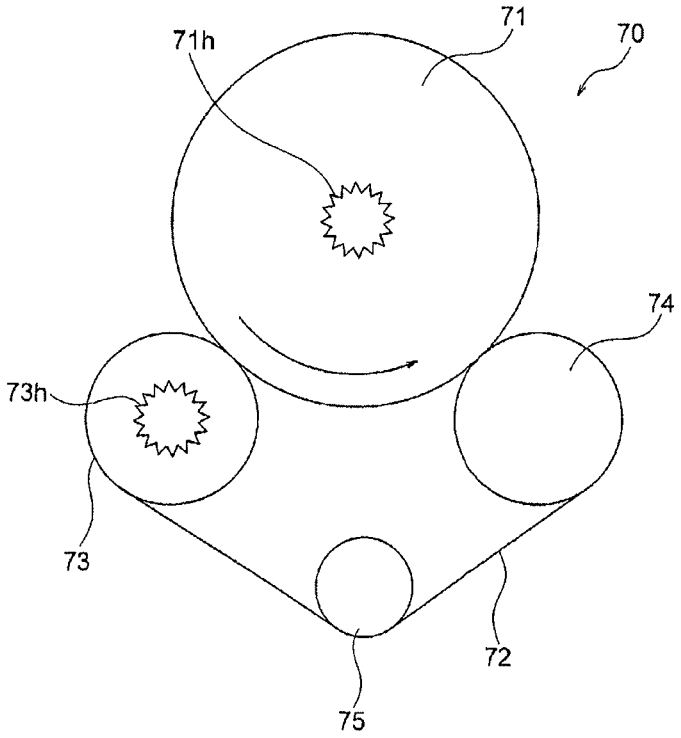
FIG. 3 is a vertical sectional view of a fuser of a first embodiment.

Next, the fuser 70 of the first embodiment will be described in detail with reference to FIG. 3.

The fuser 70 includes a heat roller 71, an endless belt 72, a first press roller 73, a second press roller 74, a tension roller 75 and the like.

The heat roller 71 is arranged at the intermediate transfer belt 51 side with respect to the feeding section 80. Although not shown, the heat roller 71 is connected to a drive source at one side, and has a function of a drive roller, and rotates in a counterclockwise direction in FIG. 2. Besides, the heat roller 71 has a shape of an inner pipe made of metal, and includes a halogen lamp heater 71h as a not-shown heat source. The halogen lamp heater 71h is the heat source to melt the toner. The heat source is not limited to the halogen lamp heater, and may be a heat source using an induction heating coil provided at an outer peripheral side of the heat roller 71. Besides, in the heat roller 71, an elastic member such as rubber may be provided on the outer peripheral surface of the pipe made of metal in order to protect the heat roller. The heat roller 71 contacts the toner image side of the sheet on which the toner image is transferred by the transfer roller 55.

The endless belt 72 is arranged on the opposite side to the intermediate transfer belt 51 side with respect to the feeding section 80. The endless belt 72 is arranged so that a part of the outer peripheral surface contacts the outer peripheral surface of the heat roller 71, and the sheet P is nipped and heated in a nip portion as the contact area. The endless belt 72 is a belt made of metal or polyimide. The endless belt 72 is driven by the driving of the heat roller 71 and is rotated in a clockwise direction in FIG. 3. The belt width of the endless belt 72 in a direction perpendicular to the rotation direction is substantially equal to the length of the heat roller 71 in the axial direction.

The first press roller 73 is arranged inside the endless belt 72, and contacts a part of the inner periphery of the endless belt 72. A part of the outer periphery of the endless belt 72 at a position where the outer peripheral surface of the first press roller 73 contacts the inner peripheral surface of the endless belt 72 contacts the heat roller 71, and this part is an insertion part. That is, a part of the endless belt 72 is arranged between the heat roller 71 and the first press roller 73 in a state where the endless belt contacts both the heat roller 71 and the first press roller 73. The outer peripheral length of the first press roller 73 is significantly shorter than the inner peripheral length of the endless belt 72. The first press roller 73 is such that an elastic rubber is wound around a metal hollow shaft. A halogen lamp heater 73b as a heating source is provided inside the hollow shaft. The first press roller 73 is a driven roller that receives rotation driving of the heat roller 71 through the endless belt 72 and is rotated. The frictional resistance of a contact surface between the inside of the endless belt 72 and the first press roller 73 is higher than the frictional resistance of a contact surface between the outside of the endless belt 72 and the heat roller 71.

The second press roller 74 is arranged inside the endless belt 72, and contacts a part of the inner periphery of the endless belt 72. A part of the outer periphery of the endless belt 72 at a position where the outer peripheral surface of the second press roller 74 contacts the inner peripheral surface of the endless belt 72 contacts the heat roller 71, and this part is an exit part. That is, a part of the endless belt 72 is arranged between the heat roller 71 and the second press roller 74 in a state where the endless belt contacts both the heat roller 71 and the second press roller 74. The outer peripheral length of the second press roller 74 is significantly shorter than the inner peripheral length of the endless belt 72. The second press roller 74 is such that an elastic rubber is wound around a metal shaft. The second press roller 74 is a driven roller that receives rotational driving of the heat roller 71 through the endless belt 72 and is rotated. The frictional resistance of a contact surface between the inside of the endless belt 72 and the second press roller 74 is higher than the frictional resistance of a contact surface between the outside of the endless belt 72 and the heat roller 71.

A portion between the insertion part and the exit part is a nip portion, and continuously contacts the outer periphery of the heat roller 71, and the shape of the endless belt 72 is deformed into an arc shape along the shape of the outer periphery of the heat roller 71.

The tension roller 75 is arranged inside the endless belt 72, and contacts a part of the inner peripheral surface of the endless belt 72. A position where the tension roller 75 contacts the endless belt 72 is between the first press roller 73 and the second press roller 74, and is on the opposite side to the area where the nip portion is formed. The tension roller 75 is a roller for applying a tensile force to the endless belt 72, and applies a specific pressure to the endless belt 72 in an outer peripheral direction and applies tension to the endless belt 72.

Figure 4:
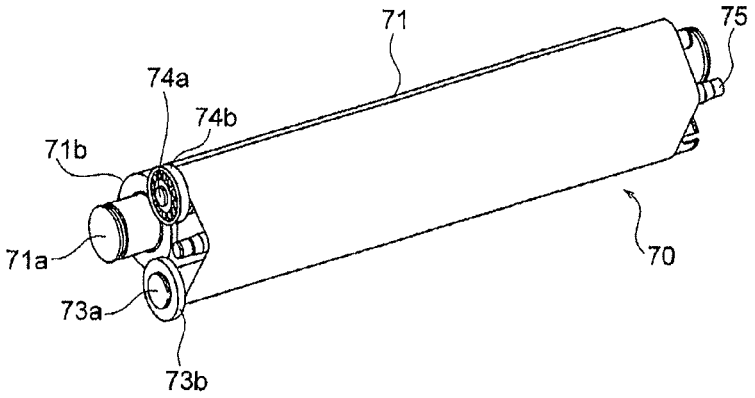
FIG. 4 is a perspective view of the fuser of the first embodiment

Next, the fuser 70 of the first embodiment will be described in more detail with reference to FIG. 4.

The heat roller 71 includes, at the rotation center, a rotary shaft 71a that is hollow and includes the halogen lamp heater 71h therein, and a rubber 71b is wound around the rotary shaft.

The first press roller 73 includes, at the rotation center, a rotary shaft 73a that is hollow and includes the halogen lamp heater 73h therein. A sliding bearing 73b is provided at one end of the rotary shaft 73a and outside the endless belt 72 in the width direction of the endless belt 72. The sliding bearing is well known, and the outer periphery of the sliding bearing 73b is fixed in a hole provided in a not-shown frame of the fuser.

The second press roller 74 includes a rotary shaft 74a at the rotation center. A ball bearing 74b is provided at the same side as the one end side of the first press roller 73 and outside the endless belt 72 in the width direction of the endless belt 72. The ball bearing 74b is well known, and many balls as rolling elements are provided between an outer ring and an inner ring. The length of the outer ring and the inner ring of the ball bearing 74b in the rotary shaft direction is equal to the length of the sliding bearing 73b in the rotary shaft 73a direction. The inner ring of the ball bearing 74b is engaged with the outer periphery of the rotary shaft 74a of the second press roller under a specific pressure. The outer ring of the ball bearing 74b is fixed in a hole provided in the not-shown frame of the fuser.

The first press roller 73 and the second press roller 74 are fixed to the fuser 70 by the different bearings. That is, the first press roller 73 is fixed to the fuser 70 through the sliding bearing 73b, and the second press roller 74 is fixed to the fuser 70 through the ball bearing 74b. The sliding bearing 73b generally has a resistance larger than the ball bearing 74b. Incidentally, although the description is made on the bearing (the sliding bearing and the ball bearing) provided only on the one end side of the first press roller 73 and the second press roller 74, the same bearing is provided also at the other end side.

Next, the action of fixing in the first embodiment will be described.

The sheet P to which transfer is performed by the transfer roller 55 is further fed, and is fed to the fuser 70. When reaching the insertion part, the sheet P receives heat from the heat roller 71 and is heated, and the toner on the sheet P is melted and is fixed to the sheet P. Besides, the sheet, together with the endless belt 72, is moved by the rotation force of the heat roller 71 and is fed to the exit part. At this time, the sheet P is positioned between the heat roller 71 and the endless belt 72 and is fed. The sheet P is fed to the downstream side of the fuser 70 and is discharged from the image forming apparatus 1.

The first press roller 73 receives the rotation force transmitted from the heat roller 71 through the endless belt 72 and is rotated. Since the first press roller 73 applies a specific pressure to the endless belt 72 at the heat roller 71 side, a specific rotational resistance is generated at the insertion part at the time of rotation. Besides, the second press roller 74 also receives the rotation force transmitted from the heat roller 71 through the endless belt 72 and is rotated. Since the second press roller 74 applies a specific pressure to the endless belt 72 at the heat roller 71 side, a specific rotational resistance is generated at the exit part at the time of rotation. Although the rotation driving force is received from the same heat roller 71, since the bearings are different members, the resistance at the first press roller 73 side using the sliding bearing is larger. Accordingly, the speed at which the endless belt 72 is sent from the first press roller 73 is lower than the speed at which the endless belt is pulled by the second press roller 74. Accordingly, in the nip area between the first press roller 73 and the second press roller 74, the action of pulling the endless belt to the first press roller 73 side occurs. Thus, even if a firm sheet such as a thick paper is fed to the nip area, floating of the endless belt 74 can be prevented against the firmness (separation between the heat roller 71 and the endless belt 72 can be prevented). By this, adhesion between the heat roller 71 and the sheet P is maintained, and excellent fixing can be realized.

Second Embodiment

Figure 5:
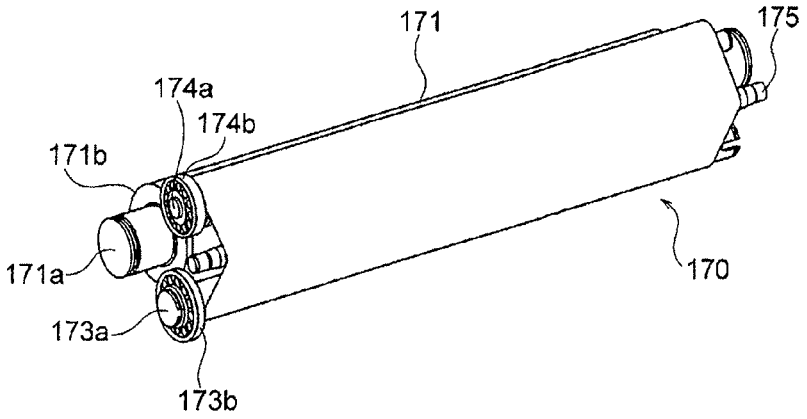
FIG. 5 is a perspective view of a fuser of a second embodiment.

A fuser of a second embodiment will be described with reference to FIG. 5. Incidentally, concerning the portions described with reference to FIG. 1 to FIG. 3 in the first embodiment, since the structures and the operations are the same, the description thereof will be omitted. Concerning the portions described with reference to FIG. 4, portions having the same or similar structure are denoted by reference numerals obtained by adding 100 to the reference numerals of the first embodiment, and the description of the same structure and the same operation will be omitted, and only different portions will be described.

In the second embodiment, a different point is that a ball bearing 173b is provided instead of the sliding bearing 73b of the first press roller 73 in the first embodiment. That is, in the second embodiment, bearings provided in a first press roller 173 and a second press roller 174 are the same kind of ball bearings. Here, a difference is that the size of an inner diameter of an inner ring of the ball bearing at the first press roller 173 side is larger than that at the second press roller 174 side. Thus, the outer diameter of the inner ring and the inner diameter and the outer diameter of an outer ring at the first press roller 173 side are also larger, and the number of balls between the inner ring and the outer ring is also larger. Incidentally, the length of the ball bearing 173b of the first press roller in the rotary shaft direction is equal to the length of the ball bearing 174b of the second press roller in the rotary shaft direction.

Thus, resistance received by a rotary shaft 173a of the first press roller is larger than resistance received by a rotary shaft 174a of the second press roller. Accordingly, speed at which an endless belt 172 is sent from the first press roller 173 is lower than speed at which the endless belt is pulled by the second press roller 174. Accordingly, in a nip area between the first press roller 173 and the second press roller 174, the action of pulling the endless belt to the first press roller 173 side occurs. Thus, even if a firm sheet such as a thick paper is fed to the nip area, floating of the endless belt 172 can be prevented against the firmness. By this, adhesion between the heat roller 171 and the sheet P is maintained, and excellent fixing can be realized.

Third Embodiment

Figure 6:
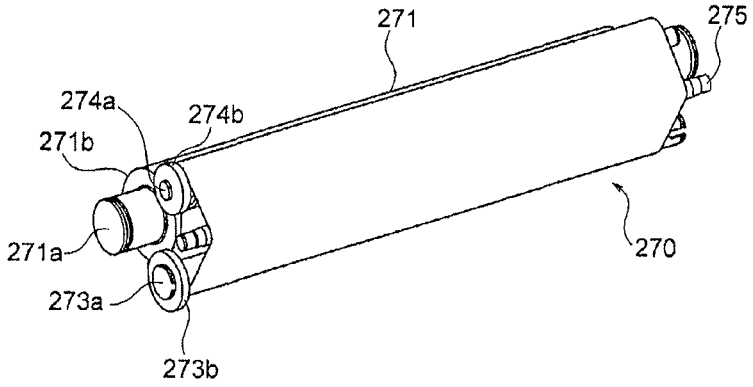
FIG. 6 is a perspective view of a fuser of a third embodiment.

A fuser of a third embodiment will be described with reference to FIG. 6. Incidentally, concerning the portions described with reference to FIG. 1 to FIG. 3 in the first embodiment, since the structures and the operations are the same, the description thereof will be omitted. Concerning the portions described with reference to FIG. 4, portions having the same or similar structure are denoted by reference numerals obtained by adding 200 to the reference numerals of the first embodiment, and the description of the same structure and the same operation will be omitted, and only different portions will be described.

In the third embodiment, a difference is that a sliding bearing 274b is provided instead of the ball bearing 74b of the second press roller 74 in the first embodiment. That is, in the third embodiment, bearings provided in a first press roller 273 and a second press roller 274 are the same kind of sliding bearings. Here, a difference is that the size of a diameter of an inner periphery of the sliding bearing at the first press roller 273 side is larger than that at the second press roller 274 side. Thus, an area in which the inner periphery of the sliding bearing contacts the outer periphery of a rotary shaft at the first press roller 273 side is larger than that at the second press roller 274 side. Incidentally, the length of the sliding bearing 273b of the first press roller 273 in the rotary shaft direction is equal to the length of the sliding bearing 274b of the second press roller in the rotary shaft direction. In the third embodiment, similarly to the second embodiment, although the rotary shaft at the first press roller 273 side is made larger, the diameters of the rotary shafts of the first press roller 273 and the second press roller 274 may be made equal to each other.

Resistance received by a rotary shaft 273a of the first press roller is larger than resistance received by a rotary shaft 274a of the second press roller. Accordingly, speed at which an endless belt 272 is sent from the first press roller 273 is lower than speed at which the endless belt is pulled by the second press roller 274. Accordingly, in a nip area between the first press roller 273 and the second press roller 274, the action of pulling the endless belt to the first press roller 273 side occurs. Thus, even if a firm sheet such as a thick paper is fed to the nip area, floating of the endless belt 272 can be prevented against the firmness. By this, adhesion between the heat roller 271 and the sheet P is maintained, and excellent fixing can be realized.

Fourth Embodiment

Figure 7:
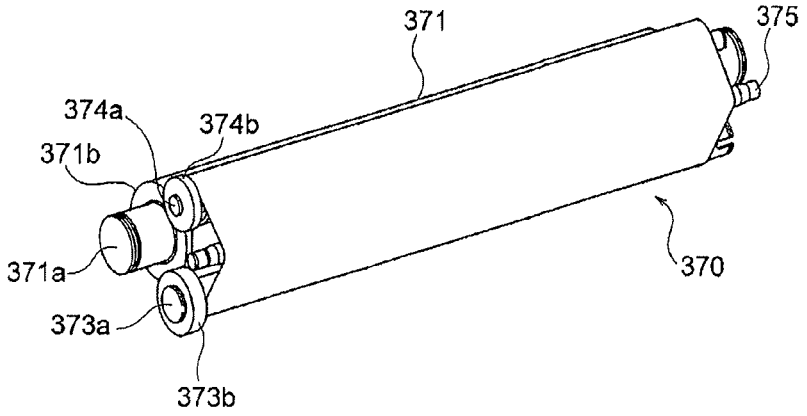
FIG. 7 is a perspective view of a fuser of a fourth embodiment.

A fuser of a fourth embodiment will be described with reference to FIG. 7. Incidentally, concerning the portions described with reference to FIG. 1 to FIG. 3 in the first embodiment, since the structures and the operations are the same, the description thereof will be omitted. Concerning the portions described with reference to FIG. 4, portions having the same or similar structure are denoted by reference numerals obtained by adding 300 to the reference numerals of the first embodiment, and the description of the same structure and the same operation will be omitted, and only different portions will be described.

The description of the fourth embodiment is almost equal to the description of the third embodiment. In the third embodiment, the description is made on the case where the length of the sliding bearing 273b of the first press roller in the rotary shaft direction is equal to the length of the sliding bearing 274b of the second press roller in the rotary shaft direction. In the fourth embodiment, the length of a sliding bearing 373b of a first press roller in the rotary shaft direction is longer than the length of a sliding bearing 374b of a second press roller in the rotary shaft direction. An area where the inner periphery of the sliding bearing contacts the outer periphery of the rotary shaft at the first press roller 373 side is larger than that at the second press roller 374 side. In the fourth embodiment, similarly to the third embodiment, although the rotary shaft at the first press roller 373 side is made larger, the diameters of the rotation shafts of the first press roller 373 and the second press roller 374 may be made equal to each other.

Resistance received by the rotary shaft 373a of the first press roller is larger than resistance received by the rotary shaft 374a of the second press roller. Accordingly, speed at which an endless belt 372 is sent from the first press roller 373 is lower than speed at which the endless belt is pulled by the second press roller 374. Accordingly, in a nip area between the first press roller 373 and the second press roller 374, the action of pulling the endless belt to the first press roller 373 side occurs. Thus, even if a firm sheet such as a thick paper is fed to the nip area, floating of the endless belt 372 can be prevented against the firmness. By this, adhesion between the heat roller 371 and the sheet P is maintained, and excellent fixing can be realized.

Other Modified Examples

The first press roller and the second press roller use the same bearing, and the viscosity of the grease therein may be changed so that resistance at the first press roller side is larger than resistance at the second press roller side. For example, the product number of a fluorine grease is changed, a grease having a specific product number is put on the first press roller side, a grease having a product number, which reduces friction more than the grease used for the first press roller, is put on the second press roller side, and rolling maybe controlled. Besides, a grease is not used for the first press roller side, and a grease is used only for the second press roller side and rolling may be controlled.

Besides, in the respective embodiments, the position where the first press roller is in press contact with the heat roller through the endless belt is the insertion part (incoming position) of the sheet P. Besides, the position where the second press roller is in press contact with the heat roller through the endless belt is the exit part (outgoing position) of the sheet P. However, the arrangement among the heat roller, the first press roller and the second press roller is not limited to this, and the first press roller may be arranged at a position farther away from the heat roller than the insertion position of the sheet P where the heat roller contacts the endless belt. That is, the first press roller may be arranged at the position where the first press roller is not in press contact with the heat roller with through the endless belt. Similarly, the second press roller may be arranged at a position farther away from the heat roller than the exit position of the sheet P where the heat roll contacts the endless belt, and the second press roller is not in press contact with the heat roller with through the sheet belt.

In the image forming apparatus of the embodiment, the description is made on the case where the sheet P fed in the vertical direction is fixed, the embodiment may be applied to an image forming apparatus in which fixing is performed to the sheet P which is fed in the horizontal direction.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and their equivalents are intended to cover such forms of modifications as would fall within the scope and spirit of the invention.

What is claimed is:

[1. A fuser comprising:

a heat roller configured to rotate, contact a toner surface side of a sheet and heat the sheet;

an endless belt that contacts a part of an outer peripheral surface of the heat roller;

a first press roller that contacts a part of an inner peripheral surface of the endless belt and is provided at an insertion part of the sheet in a nip portion where the heat roller contacts the endless belt; and a second press roller that contacts a part of the inner peripheral surface of the endless belt and is provided at an exit part of the sheet in the nip portion, wherein the first press roller includes a first bearing at an end of a rotary shaft of the first press roller, the second press roller include a second bearing at an end of a rotary shaft of the second press roller, a bearing type of the second bearing is different from a bearing type of the first bearing, and the second bearing has a rotational resistance lower than the first bearing.]

[2. The fuser according to claim 1, wherein the first press roller and the second press roller apply a specific tensile force to the endless belt and form the nip portion.]

[3. The fuser according to claim 1, wherein the first bearing of the first press roller is a sliding bearing assembly, and the second bearing of the second press roller is a ball bearing assembly.]

[4. The fuser according to claim 1, wherein the first bearing of the first press roller is a sliding bearing assembly, and the second bearing of the second press roller has a longer length in a rotary shaft direction than the first bearing of the first press roller.]

[5. The fuser according to claim 1, wherein the first bearing of the first press roller is provided at both ends of the rotary shaft of the first press roller, and the second bearing of the second press roller is provided at both ends of the rotary shaft of the second press roller.]

[6. The fuser according to claim 1, wherein the first bearing of the first press roller is a sliding bearing assembly, and the second bearing of the second press roller has a longer length in a rotary shaft direction than the first bearing of the first press roller.]

[7. The fuser according to claim 6, wherein the first bearing of the first press roller has a grease different from that of the second bearing of the second press roller, and a viscosity of the grease used for the first bearing of the first press roller is higher than a viscosity of the grease of the second bearing of the second press roller.]

[8. The fuser according to claim 1, wherein the rotary shaft of the first press roller has a diameter larger than a diameter of the rotary shaft of the second press roller.]

[9. The fuser according to claim 2, wherein a part of the endless belt is arranged between the heat roller and the first press roller in a state where the endless belt contacts both the heat roller and the first press roller.]

[10. The fuser according to claim 9, wherein a part of the endless belt is arranged between the heat roller and the second press roller in a state where the endless belt contacts both the heat roller and the second press roller.]

[11. The fuser according to claim 2, wherein a frictional resistance of a contact surface between an inside of the endless belt and the first press roller is higher than a frictional resistance of a contact surface between an outside of the endless belt and the heat roller.]

[12. An image forming apparatus comprising:

a plurality of photoconductive bodies on each of which a latent image is formed;

a developing unit configured to supply a developer to the photoconductive bodies and form toner images on the photoconductive bodies;

a transfer unit configured to transfer the toner images formed on the photoconductive bodies by the developing unit to a sheet;

a heat roller configured to rotate, contact a toner surface side of the sheet and heat the sheet;

an endless belt that contacts a part of an outer peripheral surface of the heat roller;

a first press roller that contacts a part of an inner peripheral surface of the endless belt and is provided at an insertion part of the sheet in a nip portion where the heat roller contacts the endless belt; and a second press roller that contacts a part of the inner peripheral surface of the endless belt and is provided at an exit part of the sheet in the nip portion, wherein the first press roller includes a first bearing at an end of a rotary shaft of the first press roller, the second press roller include a second bearing at an end of a rotary shaft of the second press roller, a bearing type of the second bearing is different from a bearing type of the first bearing, and the second bearing has a rotational resistance lower than the first bearing.]

[13. The apparatus according to claim 12, wherein the first press roller and the second press roller apply a specific tensile force to the endless belt and form the nip portion.]

[14. The apparatus according to claim 12, wherein the first bearing of the first press roller is a sliding bearing assembly, and the second bearing of the second press roller is a ball bearing assembly.]

*15. A fuser for fusing a toner on a surface of a sheet, comprising:*

*a rotary member configured to rotate and contact a toner receiving side of a sheet;*

*an endless belt contacting an outer peripheral surface of the rotary member;*

*a first roller contacting an inner peripheral surface of the endless belt, the first roller provided at an insertion location of a sheet into a nip portion of the fuser formed where the rotary member contacts the endless belt;*

*a second roller contacting the inner peripheral surface of the endless belt at an exit location of a sheet from the nip portion; and*

*a heater configured to heat the sheet, wherein*

*the first roller includes a first bearing and the second roller includes a second bearing, and*

*the first bearing is of a type having a first rotational resistance and the second bearing is of a type having a second rotational resistance that is lower than the first rotational resistance such that the surface speed of the first roller surface which contacts the endless belt is lower than the surface speed of the second roller surface which contacts the endless belt.*

*16. The fuser of claim 15, wherein the first bearing and the second bearing are different bearing types.*

*17. The fuser of claim 16, wherein the second bearing is a roller bearing and the first bearing is a bearing type other than a roller bearing having a rolling resistance greater than a roller bearing.*

*18. The fuser of claim 15, wherein the first bearing is a roller bearing of a first size and the second bearing is a roller bearing of a second size, and the first size is greater than the second size.*

*19. The fuser of claim 15, wherein the first and second rollers have a central longitudinal axis, and the first bearing is longer in a central longitudinal axis direction than the length of the second bearing in the central longitudinal axis direction.*

*20. The fuser of claim 15, wherein the first bearing is lubricated with a first grease and the second bearing is lubricated with a second grease that is different from the first grease.*

*21. The fuser of claim 20, wherein the first grease has a viscosity higher than a viscosity of the second grease.*

*22. The fuser of claim 15, wherein the first bearing is a sliding bearing of a first length along a rotational axis of the first roller and the second bearing is a sliding bearing of a second length along a rotational axis of the second roller, the first length being greater than the second length.*

*23. A fuser for fusing a toner on a surface of a sheet, comprising:*

*a rotary member configured to rotate and contact a toner receiving side of a sheet;*

*an endless belt contacting an outer peripheral surface of the rotary member;*

*a first roller contacting an inner peripheral surface of the endless belt, the first roller provided at an insertion location of a sheet into a nip portion of the fuser formed where the rotary member contacts the endless belt;*

*a second roller contacting the inner peripheral surface of the endless belt at an exit location of a sheet from the nip portion; and*

*a heater configured to heat the sheet, wherein*

*the first roller includes a first bearing assembly having a first grease type applied thereto,*

*the second roller includes a second bearing assembly having a second grease type applied thereto, and*

*the first grease type has a higher viscosity than the second grease type such that the surface speed of the first roller surface which contacts the endless belt is lower than the surface speed of the second roller surface which contacts the endless belt.*

*24. A fuser for fusing a toner on a surface of a sheet, comprising:*

*a rotary member configured to rotate and contact a toner receiving side of a sheet;*

*an endless belt contacting an outer peripheral surface of the rotary member;*

*a first roller contacting an inner peripheral surface of the endless belt, the first roller provided at an insertion*

*location of a sheet into a nip portion of the fuser formed where the rotary member contacts the endless belt;*

*a second roller contacting the inner peripheral surface of the endless belt at an exit location of a sheet from the nip portion; and*

*a heater configured to heat the sheet, wherein*

*the first roller includes a first bearing that is a first size type and the second roller includes a second bearing that is a second size type that is different from the first size type, and*

*the second bearing has a rotational resistance that is lower than a rotational resistance of the first bearing.*

*25. The fuser of claim 24, wherein the surface speed of the first roller surface which contacts the endless belt is lower than the surface speed of the second roller surface which contacts the endless belt.*

*26. The fuser of claim 24, wherein the first size type has an inner diameter that is larger than an inner diameter of the second size type.*

* * * * *